United States Patent [19]
Blanpied

[11] Patent Number: 5,166,182
[45] Date of Patent: Nov. 24, 1992

[54] THERMOSETTING PLASTIC FOAMS AND METHODS OF PRODUCTION THEREOF USING NOVEL BLOWING AGENTS

[75] Inventor: Robert H. Blanpied, Meridian, Miss.

[73] Assignee: Atlas Roofing Corporation, Meridian, Miss.

[21] Appl. No.: 855,487

[22] Filed: Mar. 23, 1992

[51] Int. Cl.$^5$ .............................................. C08G 18/14
[52] U.S. Cl. ....................................... 521/50; 521/113; 521/114; 521/117; 521/121; 521/128; 521/130; 521/131
[58] Field of Search ................. 521/50, 113, 114, 117, 521/121, 128, 130, 131

[56] References Cited

U.S. PATENT DOCUMENTS

| | | | |
|---|---|---|---|
| 3,993,609 | 11/1976 | Kamens et al. | 521/138 |
| 4,572,865 | 2/1986 | Gluck et al. | 428/309 |
| 4,636,529 | 1/1987 | Crooker | 521/131 |
| 4,710,521 | 12/1987 | Soukup et al. | 521/118 |
| 4,927,863 | 5/1990 | Bartlett et al. | 521/131 |
| 4,960,804 | 10/1990 | Doerge | 521/130 |
| 4,981,879 | 1/1991 | Snider | 521/131 |
| 5,032,623 | 7/1991 | Keske et al. | 521/131 |

OTHER PUBLICATIONS

N. Malwitz, P. A. Manis, S.-W. Wong and K. C. Frisch, "Amine Catalysis of Polyurethane Foams" 30th Annual Polyurethane Conference, Oct. 15–17, 1986, pp. 338–353.

*Primary Examiner*—Maurice J. Welsh
*Attorney, Agent, or Firm*—Nixon & Vanderhye

[57] ABSTRACT

Blowing agents and blowing agent mixtures for preparing a cellular thermosetting plastic foam comprise either (1) a non-chlorinated, partially hydrogenated fluorocarbon with the general formula $H_xF_yC_z$; (2) a non-chlorinated, partially hydrogenated fluorocarbon ether with the general formula $H_xF_yC_z$—O—$C_mF_nH_p$; (3) a non-chlorinated, non-hydrogenated, fully fluoronated fluorocarbon; (4) an azeotropic mixture having a boiling point below 50 degrees Celsius; or (5) any mixture of the foregoing. The azeotropic mixtures are produced from organic compounds having surface active properties that enable the blended azeotropic mixture to become miscible with polymer resins. Among the preferred compounds for use in azeotropic mixtures are n-pentane, acetone, methyl alcohol, methyl formate, ethyl formate, ethyl alcohol, 2-methyl butane, nitromethane, cyclopentane, 2,3,-dimethyl butane, 2,2,-dimethyl butane, and dimethyl sulfide. The azeotropic blowing agents and blowing agent systems of the invention can be mixed with partially hydrogenated fluorocarbons and chlorofluorocarbons, and are useful for preparing low density polyurethane, polyisocyanurate, polyurethane modified polyisocyanurate, and phenol-formaldehyde foams.

42 Claims, No Drawings

THERMOSETTING PLASTIC FOAMS AND METHODS OF PRODUCTION THEREOF USING NOVEL BLOWING AGENTS

This is a continuation of application Ser. No. 07/568,707, filed Aug. 17, 1990, now abandoned.

BACKGROUND

1. Field of Invention

This invention pertains to thermosetting plastic foams, including polyurethane, polyisocyanurate, urethane modified polyisocyanurate, and phenol-formaldehyde foams, and particularly to the production of such foams using novel blowing agents.

2. Prior Art and Other Considerations

Cellular organic plastic foams made either by polymerizing phenol-formaldehyde resin, or made with urethane linkages, or made with isocyanurate linkages, or a combination, are well known in the art. Generally, these foams have been made by catalyzing a mixture of phenolformaldehyde resins, or by the catalyzed reaction between polymeric multi-functional polyisocyanates and polyols, as well as the trimerization of the polymeric polyisocyanate, in the presence of commercially available, and low cost blowing agents to form the cellular structure and low density.

The value of a blowing agent lies, in some measure, in its ability to boil at a low enough temperature that closed cells are formed inside the liquid, or semi-liquid, thermosetting plastic prior to the plastic becoming too "solid" to allow the gas to expand. Thus, ethyl alcohol, which boils at 78.3 degrees Celsius is not a suitable blowing agent by itself, because most usable foams will become semi-solids by the time they reach that temperature. Likewise, a blowing agent must be miscible with the resin it is mixed with, so that the particles of blowing agent are well distributed throughout the resin.

The prior art is replete with references to the art of blowing thermosetting resins to form low density foam products. The predominate blowing agent used in commercial rigid foam products made from thermosetting plastics has been tricloromonofluoromethane (CFC-11), either alone or in conjunction with other blowing agents.

The recent advent of partially hydrogenated chlorofluorocarbons (called "HCFCs") as a blowing agent material presents both new problems and new opportunities, for the preparation of low density cellular foams.

The early work using the new HCFCs alone, or in conjunction with $CO_2$ gas, has shown the rapid diffusion of both the HCFC gas and the $CO_2$ gas out of the foam cells. The most preferred new HCFC is HCFC-141b, which shows a particular tendency to escape rapidly from the foam cells. The other new blowing agent for thermosetting foams is HCFC-123, which does not diffuse through prior art cell walls as rapidly as does HCFC-141b.

Another new class of blowing agents is non-chlorinated, partially hydrogenated fluorocarbons, having the general formula $H_xF_yC_z$. Yet another similar class of blowing agents is partially hydrogenated fluorocarbon ethers with the general formula $H_xF_yC_z—O—C_mF_nH_p$. Both classes are referred to herein as "partially hydrogenated fluorocarbons" and abbreviated as "HFCs". Neither of these classes include chlorine. Yet another class of blowing agents is fully fluorinated fluorocarbans with the general formula $F_yC_z$. This class is abbreviated "FCs".

A new class of polyols has been described in the U.S. application Ser. No. 07/495,616, filed Mar. 19, 1990, incorporated herein by reference. This new class of polyols substantially reduces the rate of diffusion of the new HCFCs out of the urethane modified polyisocyanurate foam cells made with these polyols.

Accordingly, it is an object of the present invention to provide a thermosetting foam having a good thermal resistance value, and a method of producing the same using a novel blowing agent system which has a slow rate of diffusion out of the foam cells.

An advantage of the present invention is the provision of blowing agents that facilitate improved long-term R-values of plastic foams.

An advantage of the present invention is the provision of several alternative combinations of blowing agents, thereby offering the foam insulation designer multiple choices.

Another advantage of the present invention is the use of common materials with low costs to be used as blowing agents.

Yet another advantage is the provision of a blowing agent system which reduces or eliminates the use of CFC and HCFC gasses, thereby eliminating the potentially harmful effects of chlorine on the environment.

SUMMARY

Blowing agents and blowing agent mixtures for preparing a cellular thermosetting plastic foam comprise either (1) a non-chlorinated, partially hydrogenated fluorocarbon with the general formula $H_xF_yC_z$; (2) a nonchlorinated, partially hydrogenated fluorocarbon ether with the general formula $H_xF_yC_z—O—C_mF_nH_p$; (3) a fully fluoronated fluorocarbon with the general formula $F_yC_z$; (4) an azeotropic mixture having a boiling point below 50 degrees Celsius; or (5) any mixture of the foregoing.

The azeotropic mixtures are produced from organic compounds having surface active properties that enable the blended azeotropic mixture to become miscible with polymer resins. Among the preferred compounds for use in azeotropic mixtures are n-pentane, acetone, methyl alcohol, methyl formate, ethyl formate, ethyl alcohol, 2-methyl butane, nitromethane, cyclopentane, 2,3,-dimethyl butane, 2,2,-dimethyl butane, and dimethyl sulfide.

The blowing agents and blowing agent systems of the invention can be mixtures of partially hydrogenated fluorocarbons with chlorofluorocarbons or with azeotropic mixtures, and are useful for preparing polyurethane, polyisocyanurate, polyurethane modified polyisocyanurate, and phenol-formaldehyde foams.

All thermosetting foams of the present invention are blown without the use of any fully halogenated chlorofluorocarbons. The preferred embodiments of plastic foams of the present invention contain some partially hydrogenated fluorocarbons or chlorofluorocarbons mixed with an azeotrope. All plastic foams of this invention are blown with at least some organic chemical blowing agent; e.g., none are blown entirely with an inorganic gas such as $CO_2$, $N_2$, $SO_2$, or the like. Some foams are blown with all organic chemical compounds; e.g., no inorganic gas is used, but some foams do use some inorganic gas with the organic vapor. Thus, the foams of the present invention all use at least one organically based vapor as a blowing agent, and may or may not use an inorganic gas mixed therewith. In especially preferred embodiments, at least some organically based azeotrope is used.

DETAILED DESCRIPTION OF THE INVENTION

As indicated above, the value of a blowing agent partially lies in its ability to boil at a low enough temperature that closed cells are formed inside the liquid, or semi-liquid, thermosetting plastic prior to the plastic becoming too "solid" to allow the gas to expand. The example was provided above of ethyl alcohol, which boils at 78.3 degrees Celsius and which is not a suitable blowing agent by itself, because most usable foams will become semi-solids by the time they reach that temperature.

In accordance with the present invention, however, it will be seen that ethyl alcohol, when mixed with n-pentane, forms an azeotrope at a 5% concentration which boils at 34.3 degrees Celsius (also abbreviated as "C").

As also indicated above, a blowing agent must be miscible with the resin it is mixed with, so that the particles of blowing agent are well distributed throughout the resin. Some highly hydrophobic organic compounds such as n-pentane will not mix well with the polar, hydrophilic polyester polyol resins in common use today. In accordance with the present invention, the addition of a polar compound such as ethyl alcohol to n-pentane to form an azeotrope aids in blending the blowing agent throughout the resin. Acetone is also a highly polar compound which, when added to n-pentane at a 20% concentration, forms an azeotrope which boils at a convenient 32.5 degrees Celsius, and is miscible in a wide range of hydrophobic and hydrophilic types of polyols.

Also, because the new classes of HFCs and HCFCs are more balanced with regard to hydrophobic/hydrophilic properties than was CFC-11, they lend themselves to being easily mixed with either hydrophobic or hydrophilic resins. Likewise, the new HFCs and HCFCs help the other organic blowing agent compounds taught in this invention to be well mixed with both polar and non-polar resins.

ORGANIC CHEMICAL AZEOTROPES

There are hundreds of binary, many ternary, and a few quaternary and quinary azeotropic systems known to scientists. Many of the binary systems and at least three of the ternary azeotropic systems have boiling points below 50 degrees Celsius. Several of these systems have a boiling point within 3 degrees Celsius of the boiling point of HCFC-141b, which is 32 degrees Celsius. These azeotropes are particularly useful for plastic foam blowing when used in conjunction with HCFC-141b.

Among the most preferred compounds for use in azeotropes for blowing agents of the present invention are n-pentane, acetone, methyl alcohol, methyl formate, ethyl formate, ethyl alcohol, 2-methyl butane, nitromethane, cyclopentane, 2,3,-dimethyl butane, 2,2,-dimethyl butane, and dimethyl sulfide. Among the most preferred azeotrope systems are those which contain n-pentane with the low cost solvents, acetone, methyl alcohol, and ethyl alcohol.

In selecting compounds for use in the azeotrope systems of the invention, care should be taken in connection with foam production that the compounds employed do not present a safety hazard. In this regard, reference can be made to OSHA, NIOSH, and EPA documents, as well as to the current American Conference of Governmental Industrial Hygienists (ACGIH) listing of potential safety hazards.

AZEOTROPE EXAMPLE NO. 1

As a first example of the foregoing, one mixes 80% by weight n-pentane with 20% by weight acetone. This mixture forms an azeotrope boiling at 32.5 degrees Celsius. The mixture is used alone, or with HCFC-141b (or HCFC-123) in any thermosetting foam formulation of the prior art. When used in a polyisocyanurate type of foam, this azeotrope can also be used with water in the B-blend to form $CO_2$ as part of the blowing system.

AZEOTROPE EXAMPLE NO. 2

In another example, one mixes 44% by weight n-pentane with 56% by weight ethyl ether, which azeotrope boils at 33.7 degrees Celsius. Again, this azeotrope is used either alone, or in conjunction with other blowing agents suitable for the type of thermosetting plastic being blown into cellular foam.

AZEOTROPE EXAMPLE NO. 3

Mixing 95% Parts By Weight (Pbw) n-pentane with 5% Pbw ethyl alcohol forms an azeotrope boiling at 34.3 degrees Celsius. Again, the appropriate mixtures can be made, or the azeotrope used alone.

AZEOTROPE EXAMPLE NO. 4

An example of a useful binary azeotrope not containing n-pentane is methyl formate at 85% Pbw with 15% Pbw of 2,3,-dimethyl butane. This azeotrope boils at 30.5 degrees Celsius. As in Example No. 1, this azeotrope is used either alone or in conjunction with other blowing agents.

EXAMPLES (NOS. 5–11) OF OTHER USEFUL BINARY AZEOTROPES

TABLE I

| Example Number | Pbw n-pentane | Second Compound | Pbw 2nd Item | Boiling Point Of Azeotrope |
|---|---|---|---|---|
| No. 5 | 47% | Methyl Formate | 53% | 21.8° C. |
| No. 6 | 30% | Ethyl Formate | 70% | 32.5° C. |
| No. 7 | 93% | Methyl Alcohol | 07% | 30.9° C. |
| No. 8 | 53.4% | Methyl Sulfide | 46.6% | 31.8° C. |
| No. 9 | 78% | Methyl Propyl Ether | 22% | 35.6° C. |
| No. 10 | 99% | Nitromethane | 01% | 35.0° C. |
| No. 11 | 98.6% | Water | 01.4% | 34.6° C. |

Table I provides other examples of useful binary azeotropes. With regard to Example No. 11 of Table I, it should be pointed out that this azeotrope is the type identified as Heteroazeotrope-positive, with two phases. Also, the presence of water in this azeotrope will complicate the polymer reaction if used in the presence of polymeric isocyanate. The first ten (10) Examples provided above are Homoazeotrope-positive types of azeotropes (one phase).

AZEOTROPE EXAMPLE NO. 12

A higher boiling azeotrope is formed by mixing 14% Pbw methyl alcohol with 86% Pbw cyclopentane. This azeotrope boils at 38.8° C. By itself, methyl alcohol boils at 64.7° C., and cyclopentane boils at 49.4° C., both of which are nearly too high to be used alone as a commercial blowing agent for thermosetting foam.

AZEOTROPE EXAMPLE NOS. 13-15

Most ternary azeotropes have boiling points too high to be commercially useful, or they contain high safety risk compounds. However, three useful ternary azeotrope examples are set forth in Table II.

TABLE II

| Example | Item A | % Item A | Item B | % Item B | Item C | % Item C | Azeotrope's Boiling Point |
| --- | --- | --- | --- | --- | --- | --- | --- |
| 13 | n-pentane | 91.4% | nitromethane | 6.5% | water | 2.1% | 33.1° C. |
| 14 | n-hexane | 54.6% | methyl alcohol | 14.6% | acetone | 30.8% | 47.0° C. |
| 15 | n-hexane | 48.6% | methyl alcohol | 14.6% | methyl acetate | 36.8% | 47.4° C. |

AZEOTROPE EXAMPLE NOS. 16-20

Other binary azeotropes having boiling points between 40° C. and 50° C. which are especially useful for forming small cell sizes are set forth in Table III.

TABLE III

| Example | Item A | % Item A | Item B | % Item B | Azeotrope Boiling Point |
| --- | --- | --- | --- | --- | --- |
| 16 | cyclopentane | 62.1% | methyl acetate | 37.9% | 43.2° C. |
| 17 | cyclopentane | 92.5% | ethyl alcohol | 7.5% | 44.7° C. |
| 18 | cyclopentane | 64.0% | acetone | 36.0% | 41.0° C. |
| 19 | n-hexane | 41.0% | acetone | 59.0% | 49.8° C. |
| 20 | n-hexane | 33.0% | ethyl formate | 67.0% | 49.0° C. |

AZEOTROPE EXAMPLE NO. 21

A complex blowing agent system is formed by utilizing a commercial grade of isohexane or isopentane isomers. For example, a commercially available isohexane contains both 2,2-dimethyl butane and 2,3-dimethyl butane. The 2,2-DMB forms an azeotrope with dimethyl sulfide boiling at 36.5° C., and the 2,3-DMB forms an azeotrope with methyl formate boiling at 30.5° C.

AZEOTROPE EXAMPLE NO. 22

Blowing agent systems are made by using an azeotrope plus one of the components of the same, or a different, azeotrope. For example, methyl formate is mixed with n-pentane and methyl alcohol in a variety of proportions in which an excess of methyl formate boils alone at 31.7° C. It also forms an azeotrope with n-pentane at a 53% to 47% ratio which boils at 21.8° C., and also n-pentane will azeotrope with methyl alcohol at 93%/7% ratio which boils at 30.9° C. This range of boiling causes a smooth rise profile as the foam expands.

ORGANIC THERMOSETTING FOAMS

The use of most of the blowing agent systems of this invention requires a higher catalyst level than prior art thermosetting plastic foams (which used primarily trichloromonofluoromethane [CFC-11]). The use of water, or any other active hydrogen compound such as an organic acid such as 2-ethyl hexanoic acid, to react with polymeric isocyanate to blow urethane or urethane modified polyisocyanurate foams with $CO_2$, will also require a higher catalyst level, or a change to a more powerful catalyst, or higher initial reaction temperatures, or a combination of any two, or all three, of these changes. The weight ratios of the reacting polymers; i.e., phenol with formaldehyde; or polymeric isocyanate with polyol, do not necessarily need changing from the prior art, but one skilled in the art will quickly make the necessary changes to make optimum use of the blowing agent systems of this invention.

POLYURETHANE MODIFIED POLYISOCYANURATE FOAMS

Any commercially available polyester or polyether polyol which has been used with prior art polyurethane modified polyisocyanurate plastic foams are practical for use within the scope of this invention. The preferred polyols are those made by the process described in U.S. application Ser. No. 07/495,616, filed Mar. 19, 1990, incorporated herein by reference. Other useful polyols are the aromatic polyester polyols sold by Cape Industries, Chardonol Division of Freeman Chemical Company, and Stepan Company. The sucrose initiated polyether polyols sold by BASF, DOW, and many other companies are also useful polyols suitable for use with this invention.

As to catalysts, all of the tertiary amines, alkali metal carboxylates, and quaternary ammonium salts which have been used in prior art are suitable for making foams of the present invention.

The prior art organic surfactants can be used to modify the cell size and percent closed cell content. Alternately, the prior art silicone surfactants, the commercial grades of polydimethyl-siloxane-polyoxyalkylene block copolymers, can be used. Additionally, new silicone surfactants have been developed, such as Air Products' DC-5356, DC-5357, and DC-5367, which are the preferred silicone surfactants used in the instant invention.

FOAM EXAMPLE NO. 1

A B-blend is made up using a highly polar polyester polyol, such as Chardol 2513 from Chardonol, about 5.0 Parts per hundred resin (Phr) of a 4 to 1 mixture of potassium octoate to Polycat 43 catalyst system, a few Parts per hundred resin (Phr) of silicone surfactant DC-5357, about 1.5 Phr water, about 15 Phr of Azeotrope Example No. 1, and about 15 Phr HCFC-141b. This mixture is reacted with polymeric isocyanate at a chemical equivalent weight ratio of from 2.0-to-1.0 to 3.5-to-1.0 of NCO groups to OH groups, and makes a usable foam insulation product.

FOAM EXAMPLE NO. 2

As another example of a foam made by the present invention, a B-blend is made using 100 Pbw Pluracol 975, a partially sucrose initiated polyether polyol from BASF. To this is added 40 Pbw Azeotrope Example No. 2, the catalyst package of Foam Example No. 1 (supra), and a suitable silicone surfactant. This is reacted with at least 225 Pbw polymeric isocyanate to provide a polyurethane foam. This foam, while a suitable insulation material, is quite flammable.

FOAM EXAMPLE NO. 3

A less flammable foam is made by mixing 50% of the azeotrope of Azeotrope Example No. 5 (supra) with 50% HCFC-141b, and using this with Terate 253 made by Cape Industries, Inc. The appropriate catalysts and surfactants make a stable B-blend, which when reacted to polymeric isocyanate at a chemical equivalent ratio (Index) of NCO:OH = or > 2.5:1.0, will provide a dimensionally stable foam insulation, with good combustion resistance and good thermal conductivity resistance.

FOAM EXAMPLE NO. 4

Yet another example of useful foam blown with azeotropic mixtures of this invention, is made by blending Stepanpol PS-1502 with 3 Phr water, a 50/50 blend of the azeotrope of Azeotrope Example No. 8 (supra) with HCFC-141b, and making a foam as described in Foam Example No. 3 above.

FOAM EXAMPLE NO. 5

In an example not using an azeotrope, Stepanpol PS-1502 is mixed with 1.5 Phr 2-ethyl hexanoic acid, 2.0 Phr water, a 50/50 blend of HCFC-141b with a fully fluoronated FC such as a commercial blend containing about 90% perfluoropentane, with some perfluorohexane, which boils in the range of 28° C. to 38° C., plus the catalyst package of Foam Example No. 1. A rigid polyurethane modified polyisocyanurate foam with an Index over 2.5:1.0 is made.

EXAMPLES OF OTHER USEFUL POLYURETHANE/POLYISOCYANURATE FOAMS

All of the preceding example foams can be blown with other than a 50% to 50% ratio of an HFC or HCFC with an azeotrope. For example, all the above foams can be made with 100% HFC, 100% HCFC, or 100% azeotrope, or with any economically preferred ratio of HFC or HCFC to azeotrope. The person skilled in the art will appreciate that all azeotropes can be either used alone, or with water, or with an appropriate HFC or HCFC or any workable combination, in any preferred ratio to make a suitable foam insulation product.

PHENOL-FORMALDEHYDE THERMOSETTING FOAMS

The prior art phenolic foams have been made using fully halogenated chlorofluorocarbon blowing agents. Quite often, a mixture of these blowing agent systems has been used, such as trichlorotrifluoroethane (boiling point [B.P.] at 47.6° C.) mixed with trichloromonofluoromethane (B.P. at 23.8° C.). In the typical phenolic foam formulation has been found one or two surfactants, the main resole resin, a form of a sulfonic acid as the catalyst, and perhaps other modifiers as plasticizers, or etc.

PHENOL-FORMALDEHYDE FOAM EXAMPLE

A resole resin is made using from 1.5:1.0 up to 2.0:1.0 chemical equivalents ratio of formaldehyde:phenol catalyzed with KOH. When this reaction has proceeded to the desired viscosity, it is cooled and retarded by addition of formic acid. To this resin is added about 3 Phr of Epon epoxy resin, 3 Phr of DMP plasticizer, and about 2 Phr of a silicone surfactant. To about 70 Parts by weight (Pbw) of this mixture is added about 14 Pbw of a mixed blowing agent system such as described above, about 1.5 Pbw Arlatone "G" surfactant, about 0.1 Pbw L-5340 surfactant, and about 16 Pbw toluene sulfonic acid catalyst. This reacts to form a suitable closed cell phenolic foam.

Thus it is seen that the blowing agent systems of the present invention can be used over a wide range of thermosetting plastic foams. In fact, the whole prior art range of useful low density thermosetting plastic foam insulations can be prepared using the blowing agent systems taught by the present invention. The person skilled in the art of thermosetting foam formulations will quickly adapt to the minor changes brought about by eliminating fully halogenated chlorofluorocarbons entirely from their previous formulations.

The present invention uses the unique property of certain organic chemicals to form an azeotrope which boils at a temperature lower than either of the individual compounds. The blending of two or more organic compounds often improves the solubility, miscibility, or compatibility, of both compounds with one of the resins going into the thermosetting plastic foam. Also, the blowing agent has a low enough boiling point to boil into nearly 100% gas before the rising temperature causes curing of the polymer into a semi-solid, at which point the gas ceases to cause cellular expansion.

All thermosetting plastic foam reactions are exothermic. Additional heat energy is usually added to aid in forming a solid, and in the case of phenolic, to drive off water. If the polymer reaction approaches the solid formation state prior to having the blowing agent converted mostly to gas, proper cell sizes will not be formed; i.e., a low density will not be achieved.

Likewise, the blowing agent needs to be made compatible with the resin to which it is added. If a single blowing agent compound is not compatible, it is possible that a combination of blowing agents can be formed which will be compatible. Such a combination will act as if the blend had been treated with a surfactant.

The present invention not only uses the unique property of azeotrope formation, but it also uses the unique surface active properties of individual organic compounds which make up these azeotropes, to enable the blend to become miscible with resins which would not be compatible with just one of the compounds.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A method of making a cellular thermosetting plastic foam solid using an organic azeotropic mixture as a blowing agent, said azeotropic mixture having a boiling point below 50 degrees Celsius.

2. The method of claim 1, wherein said azeotropic mixture of claim 1 is mixed with a non-chlorinated, partially hydrogenated fluorocarbon with the general formula $H_xF_yC_z$, wherein the subscripts x, y, and z are integers, which mixture is used as a blowing agent.

3. The method of claim 1, wherein said azeotropic mixture of claim 1 is mixed with a non-chlorinated, partially hydrogenated fluorocarbon ether with the general formula $H_xF_yC_z$—O—$C_mF_nH_p$, wherein the subscripts m, n, p, x, y, and z are integers, which mixture is used as a blowing agent.

4. The method of claim 1, wherein said azeotropic mixture of claim 1 is mixed with a non-chlorinated, non-hydrogenated, fully fluoronated fluorocarbon with the general formula $F_yC_z$, wherein the subscripts y, and z are integers, which mixture is used as a blowing agent.

5. A method of making a cellular thermosetting plastic foam solid using a non-chlorinated, partially hydrogenated fluorocarbon ether with the general formula $H_xF_yC_z$—O—$C_mF_nH_p$ as a blowing agent, wherein the subscripts m, n, p, x, y, and z are integers.

6. The method of claims 1, 2, 3, 4, or 5, wherein $CO_2$ is also used at least partly as a blowing agent.

7. The method of claims 1, 2, 3, 4, or 5 wherein a partially hydrogenated chlorofluorocarbon is also used at least partly as blowing agent.

8. The method of claims 1, 2, or 3, wherein at least one of the following compounds is mixed with n-pentane (n being an integer) to form said azeotropic mixture: acetone, ethyl ether, methyl formate, ethyl formate, ethyl alcohol, methyl alcohol, methyl sulfide, methyl propyl ether, nitromethane, or water.

9. The method of claim 1, wherein said azeotropic mixture comprises methyl formate mixed with 2,3,-dimethyl butane.

10. The method of claim 1, wherein said azeotropic mixture comprises methyl alcohol mixed with cyclopentane.

11. The method of claim 1, wherein said azeotropic mixture comprises n-pentane, nitromethane, and water.

12. The method of claim 1, wherein said azeotropic mixture comprises n-hexane, methyl alcohol, and acetone.

13. The method of claim 1, wherein said azeotropic mixture comprises n-hexane, methyl alcohol, and methyl acetate.

14. The method of claim 1, wherein said azeotropic mixture comprises methyl formate, n-pentane, and methyl alcohol.

15. The method of claim 1, wherein said azeotropic mixture comprises 2,2-dimethyl butane and dimethyl sulfide.

16. The method of claim 1, wherein said azeotropic mixture comprises 2,3-dimethyl butane and methyl formate.

17. The method of claim 1, wherein said azeotropic mixture comprises cyclopentane and methyl acetate.

18. The method of claim 1, wherein said azeotropic mixture comprises cyclopentane and ethyl alcohol.

19. The method of claim 1, wherein said azeotropic mixture comprises cyclopentane and acetone.

20. The method of claim 1, wherein said azeotropic mixture comprises n-hexane and acetone.

21. The method of claim 1, wherein said azeotropic mixture comprises n-hexane and ethyl formate.

22. The method of claims 1, 4, or 5 wherein said blowing agents are mixed with an active hydrogen compound to form carbon dioxide when reacted with polymeric isocyanate.

23. A thermosetting plastic foam solid produced by the method of claim 1.

24. A thermosetting plastic foam solid produced by the method of claim 2.

25. A thermosetting plastic foam solid produced by the method of claim 3.

26. A thermosetting plastic foam solid produced by the method of claim 4.

27. A thermosetting plastic foam solid produced by the method of claim 5.

28. A thermosetting plastic foam solid produced by the method of claim 5.

29. A thermosetting plastic foam solid produced by the method of claim 7.

30. A thermosetting plastic foam solid produced by the method of claim 8.

31. A thermosetting plastic foam solid produced by the method of claim 9.

32. A thermosetting plastic foam solid produced by the method of claim 10.

33. A thermosetting plastic foam solid produced by the method of claim 11.

34. A thermosetting plastic foam solid produced by the method of claim 12.

35. A thermosetting plastic foam solid produced by the method of claim 13.

36. A thermosetting plastic foam solid produced by the method of claim 14.

37. A thermosetting plastic foam solid produced by the method of claim 15.

38. A thermosetting plastic foam solid produced by the method of claim 16.

39. A thermosetting plastic foam solid produced by the method of claim 17.

40. A thermosetting plastic foam solid produced by the method of claim 18.

41. A thermosetting plastic foam solid produced by the method of claim 19.

42. A thermosetting plastic foam solid produced by the method of claim 20.

* * * * *